United States Patent
Lu

(10) Patent No.: US 9,609,142 B2
(45) Date of Patent: Mar. 28, 2017

(54) APPLICATION PROCESSING METHOD AND MOBILE TERMINAL

(71) Applicant: TENCENT TECHNOLOGY (SHENZHEN) COMPANY LIMITED, Shenzhen (CN)

(72) Inventor: Zhaohua Lu, Shenzhen (CN)

(*) Notice: Subject to any disclaimer, the term of this patent is extended or adjusted under 35 U.S.C. 154(b) by 94 days.

(21) Appl. No.: 14/332,819

(22) Filed: Jul. 16, 2014

(65) Prior Publication Data
US 2014/0329496 A1 Nov. 6, 2014

Related U.S. Application Data

(63) Continuation of application No. PCT/CN2013/070071, filed on Jan. 5, 2013.

(30) Foreign Application Priority Data

Jan. 20, 2012 (CN) .......................... 2012 1 0018775

(51) Int. Cl.
H04M 15/00 (2006.01)
H04W 4/24 (2009.01)
(Continued)

(52) U.S. Cl.
CPC ............ H04M 15/47 (2013.01); G06F 21/10 (2013.01); G06Q 20/40 (2013.01);
(Continued)

(58) Field of Classification Search
CPC ......... H04W 4/24; H04W 12/08; H04W 4/26; H04W 4/12; H04W 28/02
(Continued)

(56) References Cited

U.S. PATENT DOCUMENTS 7,889,052 B2 * 2/2011 Berardi ................ G06Q 10/025
                                                        235/381
8,019,678 B2 * 9/2011 Wright ................... G06Q 20/04
                                                         705/35
(Continued)

FOREIGN PATENT DOCUMENTS

CN       1863243 A    11/2006
CN     102186152 A     9/2011
(Continued)

OTHER PUBLICATIONS

Japanese Office Action for Application No. 2014-552492 dated Sep. 29, 2015, and its English translation thereof.
(Continued)

*Primary Examiner* — Joseph Arevalo
(74) *Attorney, Agent, or Firm* — Harness, Dickey & Pierce, P.L.C.

(57) ABSTRACT

An application processing method and a mobile terminal are provided. The method includes: analyzing an operation right of an application when the application executes an invoking operation for a fee deduction event; allowing the application to execute the invoking operation if the application has an operation right for the fee deduction event; and forbidding the application from executing the invoking operation if the application does not have the operation right for the fee deduction event. In the present disclosure, it is not necessary to scan an application every time the application runs. It is only necessary to determine the operation right of the application, which cuts down processing time and avoids waste of system resources, while at the same time does not require participation of the user and facilitates the user to use. In this way, the user experience is improved.

18 Claims, 2 Drawing Sheets

(51) Int. Cl.
    *H04L 12/14*     (2006.01)
    *H04M 15/02*     (2006.01)
    *G06Q 20/40*     (2012.01)
    *G06F 21/10*     (2013.01)
    *H04W 12/12*     (2009.01)

(52) U.S. Cl.
    CPC .... *H04L 12/1496* (2013.01); *H04M 15/8278* (2013.01); *H04M 15/85* (2013.01); *H04M 15/854* (2013.01); *H04M 15/88* (2013.01); *H04M 15/885* (2013.01); *H04M 15/888* (2013.01); *H04W 4/24* (2013.01); *H04W 12/12* (2013.01)

(58) Field of Classification Search
    USPC ....... 455/456.3, 411, 550.1, 466, 405, 414.1, 455/41.1, 435.1, 68, 418, 67.14, 13.3
    See application file for complete search history.

(56) References Cited

U.S. PATENT DOCUMENTS

| | | | |
|---|---|---|---|
| 8,639,629 B1* | 1/2014 | Hoffman | G06Q 20/20 705/44 |
| 8,768,838 B1* | 7/2014 | Hoffman | G06Q 40/00 705/44 |
| 2002/0052841 A1* | 5/2002 | Guthrie | G06Q 20/04 705/40 |
| 2002/0194119 A1* | 12/2002 | Wright | G06Q 20/04 705/38 |
| 2006/0143713 A1* | 6/2006 | Challener | G06F 21/565 726/24 |
| 2006/0185017 A1* | 8/2006 | Challener | G06F 21/565 726/24 |
| 2006/0236395 A1* | 10/2006 | Barker | G06F 21/552 726/23 |
| 2009/0168660 A1 | 7/2009 | Bhatia et al. | |
| 2010/0229242 A1 | 9/2010 | Iga | |
| 2011/0047044 A1* | 2/2011 | Wright | G06Q 20/04 705/26.35 |
| 2011/0112869 A1* | 5/2011 | Greak | G06Q 30/06 705/4 |
| 2012/0036571 A1* | 2/2012 | Yoo | G06F 21/567 726/13 |
| 2012/0303509 A1* | 11/2012 | Brouwer | G06Q 10/0637 705/37 |
| 2014/0108251 A1* | 4/2014 | Anderson | G06Q 20/4016 705/44 |

FOREIGN PATENT DOCUMENTS

| | | |
|---|---|---|
| CN | 102209326 A | 10/2011 |
| CN | 102404706 A | 4/2012 |
| CN | 102404727 A | 4/2012 |
| EP | 2261796 A2 | 12/2010 |
| JP | 2002041170 A | 2/2002 |
| WO | 2005009019 A2 | 1/2005 |
| WO | 2007097439 A1 | 8/2007 |

OTHER PUBLICATIONS

International Search Report for Application No. PCT/CN2013/070071 dated Apr. 11, 2013, and its English translation thereof.
Shabtai, A., Y. Fledel, U. Kanonov, Y. Elovici, S. Dolev, and C. Glezer. "Google Android: A Comprehensive Security Assessment." IEEE Security & Privacy Magazine IEEE Secur. Privacy Mag. 8.2 (2010): 35-44. Web.
Extended European Search Report for Application No. 13738400.4 dated May 19, 2015.
Chinese Office Action for Application No. 201210018775.2 dated Feb. 4, 2015, and an English concise explanation of relevance thereof.
International Preliminary Report for Application No. PCT/CN2013/070071 dated Jul. 22, 2014.

* cited by examiner

APPLICATION PROCESSING METHOD AND MOBILE TERMINAL

CROSS-REFERENCE TO RELATED APPLICATIONS

This application is a continuation of PCT/CN2013/070071, filed on Jan. 5, 2013, which claims the benefit of priority from Chinese Patent Application, No. 201210018775.2 entitled "Application Processing Method and Mobile Terminal" and filed on Jan. 20, 2012, the entire contents of which are hereby incorporated by reference.

FIELD

The present disclosure relates to mobile communications and to an application processing method and a mobile terminal.

BACKGROUND

This section provides background information related to the present disclosure which is not necessarily prior art.

With the development of mobile terminals, people pay more and more attention to the security problem of mobile terminal applications, in which defense against malicious fee deduction applications is an important issue. Currently, a commonly used scheme is scan defense, the main process of which includes: first, collecting samples of malicious fee deduction applications, extracting their features and adding them to a virus library; second, when an application is to be installed or is running, scanning the application by using an anti-virus engine, and third, when the feature of the application matches a feature in the virus library (same or similar), deeming the application as a virus, and prompting a user to clean it (e.g., perform operations such as forbidding the installation, killing the virus, uninstallation, forced uninstallation, etc.). The user can perform further processes for the application according to the prompt, and keep the application of the mobile terminal to be safe.

When an application is processed the feature scanning needs to be performed, which not only consumes time, but also occupies system resources and affects the user's application utilization experience.

SUMMARY

This section provides a general summary of the disclosure, and is not a comprehensive disclosure of its full scope or all of its features.

To solve the problems of time consumption and resource occupation when the security of applications is processed in existing art, embodiments of the present disclosure provide an application processing method and a mobile terminal. The technical solutions are as follows.

In one aspect, an application processing method is provided. The method includes the following:

analyzing an operation right of an application when the application executes an invoking operation for a fee deduction event;

allowing the application to execute the invoking operation if the application has an operation right for the fee deduction event; and forbidding the application from executing the invoking operation if the application does not have the operation right for the fee deduction event.

Analyzing the operation right of the application includes the following:

obtaining an operation permission status of the application;

confirming that the application has the operation right for the fee deduction event, if the operation permission status is "allowed"; and confirming that the application does not have the operation right for the fee deduction event, if the operation permission status is "forbidden".

Before the application executes the invoking operation for the fee deduction event, the method further includes preprocessing the application.

Preprocessing the application includes the following:

scanning an installation package of the application and obtaining a feature of the application; and comparing the feature of the application with a preconfigured malicious feature, and outputting prompt information of operation forbidden if the feature of the application matches the preconfigured malicious feature.

Preprocessing the application further includes the following:

outputting prompt information of right setting if the feature of the application does not match the preconfigured malicious feature; and setting the operation permission status of the application according to received right setting information for the application.

After preprocessing the application, the method further includes:

receiving right modification information for the application and modifying the operation permission status of the application according to the right modification information.

The operation right of the application includes any one or several of the following rights:

short messaging service fee deduction rights, interactive voice response fee deduction rights, wireless application protocol fee deduction rights, wireless application protocol proxy fee deduction rights, mobile payment rights, and electronic bank fee deduction rights.

In another aspect, a mobile terminal is also provided. The mobile terminal includes the following:

an analysis module configured to analyze an operation right of an application when the application executes an invoking operation for a fee deduction event; and an execution module, configured to allow the application to execute the invoking operation if the analysis module analyzes that the application has an operation right for the fee deduction event; and forbid the application from executing the invoking operation if the analysis module analyzes that the application does not have the operation right for the fee deduction event.

The analysis module includes the following:

an obtaining module configured to obtain an operation permission status of the application; and an analysis module configured to confirm that the application has the operation right for the fee deduction event, if the operation permission status is "allowed"; and confirm that the application does not have the operation right for the fee deduction event, if the operation permission status is "forbidden".

The mobile terminal further includes the following:

a preprocessing module, configured to preprocess the application before the application executes the invoking operation for the fee deduction event.

Specifically, the preprocessing module is configured to perform the following:

scan an installation package of the application and obtain a feature of the application; and compare the feature of the application with a preconfigured malicious feature, and output prompt information of the operation forbidden if the feature of the application matches the preconfigured malicious feature.

The preprocessing module is further configured to perform the following:

output prompt information of right setting if the feature of the application does not match the preconfigured malicious feature; and set the operation permission status of the application according to the received right setting information for the application.

The mobile terminal further includes the following:

a modification module, configured to receive right modification information for the application and modify the operation permission status of the application according to the right modification information.

The operation right of the application includes any one or several of the following rights:

short messaging service fee deduction rights, interactive voice response fee deduction rights, wireless application protocol fee deduction rights, wireless application protocol proxy fee deduction rights, mobile payment rights, and electronic bank fee deduction rights.

In another aspect, a computer readable storage medium storing one or more programs configured to be executed by a computer system is provided. The one or more programs include instructions to perform the following:

analyze an operation right of an application when the application executes an invoking operation for a fee deduction event;

allow the application to execute the invoking operation if the application has an operation right for the fee deduction event; and forbid the application from executing the invoking operation if the application does not have the operation right for the fee deduction event.

In various embodiments of the present disclosure, when the security problem of an application is processed, it is not necessary to scan the application every time when the application runs, it is only necessary to determine the operation right of the application, which cuts down the processing time as well as saves resources, and meanwhile, it is not necessary for the user to participate, which facilitates the user to use and improves the user experience. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In order to describe the technical solutions of the embodiments of the present disclosure more clearly, a brief introduction of the accompanying drawings used to describe the embodiments will be given below. It is obvious that the attached drawings in the following description only show some embodiments of the present disclosure, and other drawings can be learned by those with ordinary skill in the art and without creative efforts based on these accompanying drawings.

Corresponding reference numerals indicate corresponding parts throughout the several views of the drawings.

DETAILED DESCRIPTION

Example embodiments will now be described more fully with reference to the accompanying drawings.

To make the objects, technical solutions, and advantages of the present disclosure more clear, the embodiments of the present disclosure will be further described in detail with reference to the accompanying drawings.

In the various embodiments of the present disclosure, short messaging service (SMS) channel fee deduction can be: a charge standard is set in a billing and service system, a mobile terminal actively sends a short message in a specific format to a specific service port, and preconfigured communication fees are deducted. Interactive voice response (IVR) or voice call channel fee deduction can be: a charge standard is set in a billing and service system, a mobile terminal actively dials a service number to make a voice call, and preconfigured communication fees are deducted. Wireless application protocol (WAP) channel fee deduction or WAP proxy fee deduction can be: a charge standard is set in a billing and service system, a mobile terminal connects to a specific uniform/universal resource locator (URL) via WAP, and preconfigured communication fees are deducted.

"Mobile payment" is a type of service that allows a user to use a mobile terminal to pay bills for services or products. This type of service establishes a payment account associated with a mobile terminal number for each user, and provides a way of performing payment transactions and identity authentication by a mobile terminal. "Electronic bank payment" refers to a service provided by a bank to a user to use a mobile communication network and a mobile terminal to process related bank payment services and the mobile terminal can provide a service interface.

Figure 1:
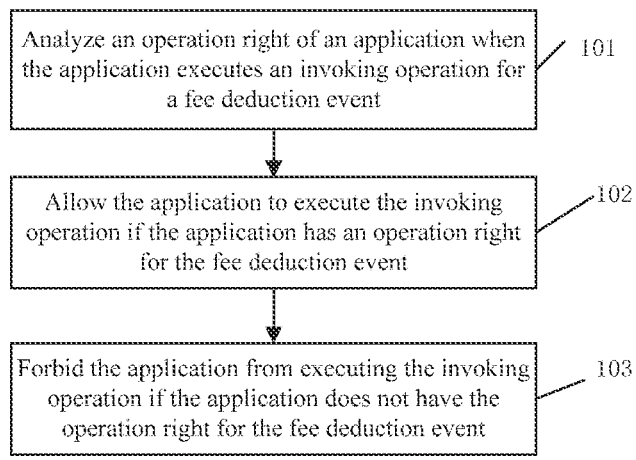
FIG. 1 shows a flowchart of an application processing method according to various embodiments.

As seen in FIG. 1, various embodiments of the present disclosure provide an application processing method, including:

101, analyzing an operation right of an application when the application executes an invoking operation for a fee deduction event;

102, allowing the application to execute the invoking operation if the application has an operation right for the fee deduction event; and

103, forbidding the application from executing the invoking operation if the application does not have the operation right for the fee deduction event.

In the various embodiments, analyzing the operation right of the application includes the following:

obtaining an operation permission status of the application;

confirming that the application has the operation right for the fee deduction event, if the operation permission status of the application is "allowed" (in an allowed status); and confirming that the application does not have the operation right for the fee deduction event, if the operation permission status of the application is "forbidden" (in a forbidden status).

Optionally, before the application executes the invoking operation for the fee deduction event, the method further includes:

preprocessing the application.

In this embodiment, preprocessing the application includes the following:

scanning an installation package of the application to obtain a feature of the application;

comparing the feature of the application with a preconfigured malicious feature; and outputting prompt information of operation forbidden if the feature of the application matches the preconfigured malicious feature.

Preprocessing the application further includes the following:

outputting prompt information of right setting if the feature of the application does not match the preconfigured malicious feature; and setting the operation permission status of the application for the application based on received right setting information.

After preprocessing the application, the method further includes the following:

receiving right modification information for the application and, based on the right modification information, modifying the operation permission status of the application.

In various other embodiments, the operation right of the application includes any one or several of the following rights: short messaging service (SMS) fee deduction rights, interactive voice response (IVR) fee deduction rights, wireless application protocol (WAP) fee deduction rights, WAP proxy fee deduction rights, mobile payment rights, and electronic bank fee deduction rights.

The mobile terminal includes: cell phones, PDAs (Personal Digital Assistants), and other devices to which this embodiment is not specifically limited.

The advantages provided by the present disclosure include, among others: analyzing an operation right of an application when the application executes an invoking operation for a fee deduction event; allowing the application to execute the invoking operation if the application has an operation right for the fee deduction event; and forbidding the application from executing the invoking operation if the application does not have the operation right for the fee deduction event. In the embodiment of the present disclosure, when the security of an application is processed, it is not necessary to scan an application every time when the application runs, it is only necessary to determine the operation right of the application, which cuts down the processing time as well as saves resources, and meanwhile, it is unnecessary for the user to participate, which facilitates the user to use and improves the user experience.

Figure 2:
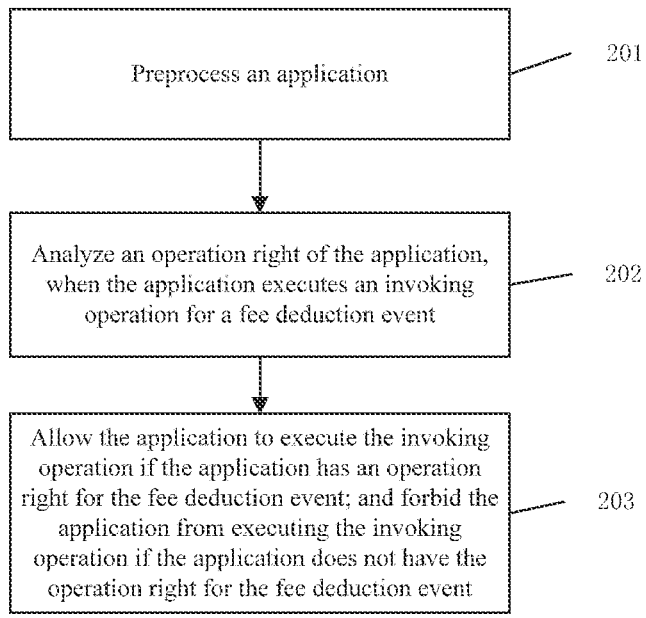
FIG. 2 shows a flowchart of an application processing method according to various embodiments.

According to various embodiments, FIG. 2 provides an application processing method. The mobile terminal can be a terminal device such as a cell phone, a PDA, etc. Using a cell phone as an example, the method specifically includes the following process.

201, an application is preprocessed.

In various embodiments, a cell phone can monitor an application and preprocess the application in the cell phone. The preprocessing process may include: scanning an installation package of the application to obtain a feature of the application; comparing the feature of the application with a preconfigured malicious feature; and outputting prompt information of operation forbidden, if the feature of the application matches the preconfigured malicious feature. For example: when the application is ready to be installed, at first the cell phone performs preprocessing for the application. Specifically, the application can be preprocessed by using security software in the cell phone (e.g., an anti-virus engine, firewall, etc.), and if the feature of the application matches a malicious feature in a preconfigured malicious program library, then it is confirmed that the application is a malicious application and prompt information of operation forbidden is output, e.g., a prompt box "the application is a malicious program!" pops up to prompt the user to refuse to install the application; as another example, when the user downloads a certain application, at first the cell phone preprocesses an installation package of the application, and if the application is a malicious program, prompt information of download forbidden is output to prompt the user not to continue to download the application. In the embodiment, "the feature of the application matches a malicious feature" may refer to that the feature of the application which is totally the same with the preconfigured malicious feature, and may also refer to the fact that that the feature of the application is similar to the preconfigured malicious feature (e.g., more than 80% or 90% of the feature is the same with the preconfigured malicious feature, and the proportion or data herein can be preconfigured as needed), and the present disclosure will not specify this.

In various embodiments, the preconfigured malicious feature can be stored in the malicious program library, and the malicious feature refers to the feature of malicious fee deduction programs. Specifically, samples of the malicious fee deduction programs can be obtained in advance, e.g., samples of various malicious fee deduction programs can be obtained from the network, and the features thereof are added to the malicious program library. Further, in the present block, preprocessing the application may further include: outputting prompt information of right setting if the feature of the application does not match the preconfigured malicious feature; and setting the operation permission status of the application based on received right setting information of the application. The operation permission status can be "allowed", indicating that the application can perform an invoking operation for the fee deduction event; and the operation permission status can be "forbidden", indicating that the application can't perform the invoking operation for the fee deduction event.

The prompt information of right setting can be used to prompt the user to set the operation permission status of the application. Specifically, every application corresponds to an operation right it may have. For example: application 1 may have a SMS fee deduction right and application 2 may have a WAP fee deduction right. The mobile terminal can first obtain an operation right that an application may have and then output prompt information of right setting to prompt the user to set the operation right that the application may have, i.e., setting an operation permission status corresponding to the operation right. For example, for application 1, the mobile terminal outputs the prompt information of right setting to prompt the user to set the SMS fee deduction right that the application may have, and the user can set the operation permission status of the SMS fee deduction right according to the prompt information. In the present embodiment, the operation right of the application includes, but is not limited to, any one or several of the following rights: SMS fee deduction rights, IVR fee deduction rights, WAP fee deduction rights, WAP proxy fee deduction rights, mobile payment rights, and electronic bank fee deduction rights.

In various embodiments, during the preprocessing process, scanning the installation package is an optional step and during the preprocessing process, scanning the installation package may not be performed and the application is installed directly, which will not be specified in the present embodiment.

202, when the application executes the invoking operation for the fee deduction event, the operation right of the application is analyzed.

In various embodiments, when an application is installed, the operation right of the application has already been set, and therefore when the application executes the invoking operation for the fee deduction event, first the operation right of the application is analyzed. Specifically, analyzing the operation right of the application includes: obtaining the operation permission status of the application; and if the operation permission status is "allowed", it is confirmed that the application has an operation right for the fee deduction event; if the operation permission status is "forbidden", it is confirmed that the application does not have the operation right for the fee deduction event.

203, if the application has the operation right for the fee deduction event, the application is allowed to execute the invoking operation; and if the application does not have the operation right for the fee deduction event, the application is forbidden from executing the invoking operation.

In various embodiments, based on the analysis result in block 202, if the application does not have the operation right for the fee deduction event, namely the operation permission status of the right is "forbidden", and then when the application runs, it is forbidden from executing the invoking operation, namely, the application being unable to perform the fee deduction. For example, when a user installs a game application, the operation permission status of the "SMS fee deduction event" of the game application is set to be "forbidden", and when the game program invokes a "send SMS to deduce" operation, the game program is forbidden from sending SMS, thereby avoiding related expenses.

In various embodiments, the mobile terminal can also receive right modification information of the application. Based on the right modification information, the operation permission status of the application is modified. For example, if the user wants to modify the operation right of an application in the mobile terminal, the user can send right modification information to the mobile terminal. The information may include: the modified operation permission status of the operation right; and the mobile terminal modifies the operation permission status of the application, and achieves the goal of modifying the right of the application.

The beneficial effects provided in the various embodiments include, among others: when an application executes an invoking operation for a fee deduction event, the operation right of the application is analyzed; if the application has an operation right for the fee deduction event, then the application is allowed to execute the invoking operation. If the application does not have an operation right for the fee deduction event, then the application is forbidden from executing the invoking operation. In various embodiments, when the security problem of an application is processed, it is not necessary to scan the application every time when the application runs, it is only necessary to determine the operation right of the application, which cuts down the processing time as well as saves resources, and in addition, it is not necessary for the user to participate, which facilitates the user to use and improves the user experience. Further, when an application is installed, first the application is scanned, and the invoking operation for the fee deduction event is then configured accordingly, which results in active defense of the fee deduction and can supplement the defense of malicious fee deduction programs that have not been found by scan defense.

Figure 3:
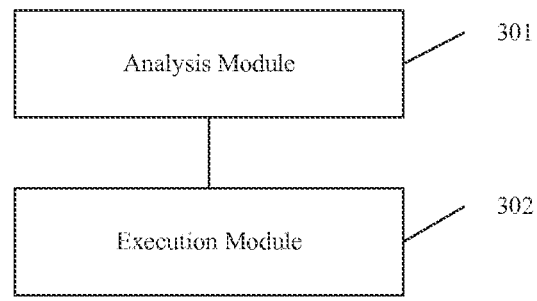
FIG. 3 shows a diagram of a mobile terminal according to various embodiments.

As shown in FIG. 3, according to various embodiments, a mobile terminal includes: an analysis module 301 and an execution module 302.

The analysis module 301 analyzes the operation right of an application when the application executes an invoking operation for the fee deduction event.

The execution module 302 allows the application to execute the invoking operation if the analysis module analyzes that the application has the operation right for the fee deduction event. If the analysis module analyzes that the application does not have the operation right for the fee deduction event, then the application is forbidden from executing the invoking operation.

Figure 4:
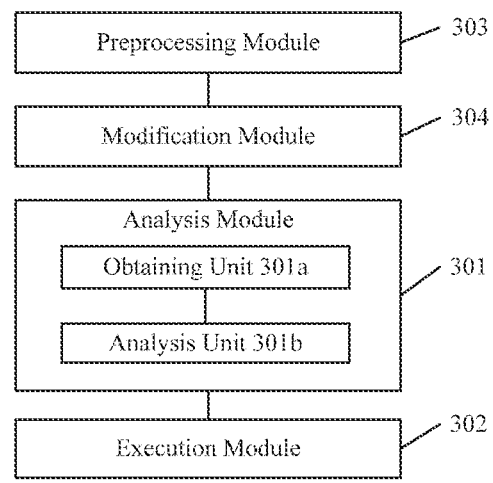
FIG. 4 shows a diagram of another mobile terminal according to various embodiments.

As shown in FIG. 4, in various embodiments, the analysis module 301 includes the following:

an obtaining unit 301a to obtain the operation permission status of the application; and an analysis unit 301b to confirm that the application has the operation right for the fee deduction event, if the operation permission status is "allowed"; and confirm that the application does not have the operation right for the fee deduction event, if the operation permission status is "forbidden".

Alternatively, the mobile terminal in various embodiments may further include:

a preprocessing module 303 to preprocess the application prior to the application executing an invoking operation for the fee deduction event.

The preprocessing module 303, as described in the present embodiment, is specifically configured to perform the following:

scan the installation package of the application and obtain a feature of the application; and compare the feature of the application with a preconfigured malicious feature and, if the feature of the application matches the preconfigured malicious feature, output prompt information of operation forbidden.

Further, the preprocessing module described in the present disclosure is further configured to perform the following:

output prompt information of right setting if the feature of the application does not match the preconfigured malicious feature; and set the operation permission status of the application according to received right setting information for the application.

In various embodiments, the mobile terminal further includes:

a modification module 304, to receive the right modification information of the application and modify the operation permission status of the application according to the right modification information.

Optionally, in various embodiments, the operation right of the application includes any one or several of the following rights: short messaging service SMS fee deduction rights, interactive voice response IVR fee deduction rights, wireless application protocol WAP fee deduction rights, WAP proxy fee deduction rights, mobile payment rights, and electronic bank fee deduction rights.

The beneficial effects provided in the various embodiments include, among others: when an application executes an invoking operation for a fee deduction event, the operation right of the application is analyzed; if the application has an operation right for the fee deduction event, the application is allowed to execute the invoking operation; if the application does not have an operation right of the fee deduction event, the application is forbidden from executing the invoking operation. In the various embodiments, when the security problem of an application is processed, it is not necessary to scan the application every time when the application runs, it is only necessary to determine the operation right of the application, which cuts down the processing time as well as saves resources; in addition, it is not necessary for the user to participate, which facilitates the ease of use and improves the user experience.

The mobile terminal provided and the method embodiment belong to the same idea. For detailed implementation thereof, please refer to the various method embodiments, which will not be elaborated herein.

One with ordinary skill in the art will understand that all or a part of the steps to realize the above embodiments can be carried out by hardware and also by instructing related hardware through programs. The programs can be stored in a computer readable storage medium, and the storage medium can be a ROM, floppy disk, compact disc, etc.

The above embodiment numbers are only for the purpose of description, and are not representative of superiority and inferiority of embodiments.

The foregoing description of the embodiments has been provided for purpose of illustration and description. It is not intended to be exhaustive or to limit the disclosure. Any modifications, equivalent replacements, and improvements made within the spirit and principle of the present disclosure should be included in the protecting scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. An application processing method for defense against malicious fee deduction applications on a mobile terminal, comprising:
    analyzing an operation right of an application in response to determining that the application executes an invoking operation for a fee deduction event;
    allowing the application to execute the invoking operation in response to confirming that the application has an operation right for the fee deduction event; and
    forbidding the application from executing the invoking operation in response to confirming that the application does not have the operation right for the fee deduction event;
    wherein analyzing the operation right of the application comprises:
        obtaining an operation permission status of the application;
        confirming that the application has the operation right for the fee deduction event, in response to determining that the operation permission status of the application is an allowed status; and
        confirming that the application does not have the operation right for the fee deduction event, in response to determining that the operation permission status of the application is a forbidden status.

2. The method according to claim 1, wherein before the application executes the invoking operation for the fee deduction event, the method further comprises: preprocessing the application.

3. The method according to claim 2, wherein preprocessing the application comprises:
    scanning an installation package of the application and obtaining a feature of the application; and
    comparing the feature of the application with a preconfigured malicious feature, and outputting prompt information of operation forbidden in response to determining that the feature of the application matches the preconfigured malicious feature.

4. The method according to claim 3, wherein preprocessing the application further comprises:
    outputting prompt information of right setting in response to determining that the feature of the application does not match the preconfigured malicious feature; and
    setting the operation permission status of the application according to received right setting information for the application.

5. The method according to claim 2, wherein after preprocessing the application, the method further comprises: receiving right modification information for the application, and modifying the operation permission status of the application according to the right modification information.

6. The method according to claim 2, wherein the operation right of the application comprises any one or several of the following rights: short messaging service fee deduction right, interactive voice response fee deduction right, wireless application protocol fee deduction right, wireless application protocol proxy fee deduction right, mobile payment right, and electronic bank fee deduction right.

7. The method according to claim 2 wherein the operation right of the application comprises any one or several of the following rights: short messaging service fee deduction right, interactive voice response fee deduction right, wireless application protocol fee deduction right, wireless application protocol proxy fee deduction right, mobile payment right, and electronic bank fee deduction right.

8. The method according to claim 1, wherein the operation right of the application comprises any one or several of the following rights: short messaging service fee deduction right, interactive voice response fee deduction right, wireless application protocol fee deduction right, wireless application protocol proxy fee deduction right, mobile payment right, and electronic bank fee deduction right.

9. A mobile terminal for defense against malicious fee deduction applications, comprising:
an analysis module to analyze an operation right of an application in response to determining that the application executes an invoking operation for a fee deduction event; and
an execution module to allow the application to execute the invoking operation in response to confirming that the analysis module analyzes that the application has an operation right for the fee deduction event; and forbid the application from executing the invoking operation in response to confirming that the analysis module analyzes that the application does not have the operation right for the fee deduction event;
wherein the analysis module comprises:
an obtaining module to obtain an operation permission status of the application; and
an analysis module to confirm that the application has the operation right for the fee deduction event, in response to determining that the operation permission status is an allowed status; and confirm that the application does not have the operation right for the fee deduction event, in response to determining that the operation permission status is a forbidden status.

10. The mobile terminal according to claim 9, wherein the mobile terminal further comprises:
a preprocessing module, configured to preprocess the application before the application executes the invoking operation for the fee deduction event.

11. The mobile terminal according to claim 10, wherein the preprocessing module is configured to:
scan an installation package of the application and obtain a feature of the application; and
compare the feature of the application with a preconfigured malicious feature, and output prompt information of operation forbidden in response to determining that the feature of the application matches the preconfigured malicious feature.

12. The mobile terminal according to claim 11, wherein the preprocessing module is further configured to:
output prompt information of right setting in response to determining that the feature of the application does not match the preconfigured malicious feature; and
set the operation permission status of the application according to the received right setting information for the application.

13. The mobile terminal according to claim 10, wherein the mobile terminal further comprises:
a modification module, configured to receive right modification information for the application and modify the operation permission status of the application according to the right modification information.

14. The mobile terminal according to claim 13, wherein the operation right of the application comprises any one or several of the following rights: short messaging service fee deduction right, interactive voice response fee deduction right, wireless application protocol fee deduction right, wireless application protocol proxy fee deduction right, mobile payment right, and electronic bank fee deduction right.

15. The mobile terminal according to claim 10, wherein the operation right of the application comprises any one or several of the following rights: short messaging service fee deduction right, interactive voice response fee deduction right, wireless application protocol fee deduction right, wireless application protocol proxy fee deduction right, mobile payment right, and electronic bank fee deduction right.

16. The mobile terminal according to claim 10, wherein the operation right of the application comprises any one or several of the following rights: short messaging service fee deduction right, interactive voice response fee deduction right, wireless application protocol fee deduction right, wireless application protocol proxy fee deduction right, mobile payment right, and electronic bank fee deduction right.

17. The mobile terminal according to claim 9, wherein the operation right of the application comprises any one or several of the following rights: short messaging service fee deduction right, interactive voice response fee deduction right, wireless application protocol fee deduction right, wireless application protocol proxy fee deduction right, mobile payment right, and electronic bank fee deduction right.

18. A non-transitory computer readable storage medium storing one or more programs configured to be executed by a computer system for defense against malicious fee deduction applications on a mobile terminal, the one or more programs comprising instructions to:
analyze an operation right of an application in response to determining that the application executes an invoking operation for a fee deduction event;
allow the application to execute the invoking operation in response to confirming that the application has an operation right for the fee deduction event; and
forbid the application from executing the invoking operation in response to confirming that the application does not have the operation right for the fee deduction event;
wherein analyzing the operation right of the application comprises:
obtaining an operation permission status of the application;
confirming that the application has the operation right for the fee deduction event, in response to determining that the operation permission status of the application is an allowed status; and confirming that the application does not have the operation right for the fee deduction event, in response to determining that the operation permission status of the application is a forbidden status.

* * * * *